United States Patent
Shivappa Thenehalli

(10) Patent No.: US 11,662,130 B2
(45) Date of Patent: May 30, 2023

(54) DOOR VENT SEALING ASSEMBLY

(71) Applicant: WHIRLPOOL CORPORATION, Benton Harbor, MI (US)

(72) Inventor: Chethan Shivappa Thenehalli, Cedar Rapids, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 298 days.

(21) Appl. No.: 17/005,476

(22) Filed: Aug. 28, 2020

(65) Prior Publication Data
US 2022/0065521 A1 Mar. 3, 2022

(51) Int. Cl.
*F25C 5/20* (2018.01)
*F25D 11/02* (2006.01)

(52) U.S. Cl.
CPC .............. *F25C 5/22* (2018.01); *F25D 11/02* (2013.01); *F25C 2400/10* (2013.01); *F25D 2317/062* (2013.01)

(58) Field of Classification Search
CPC .............. F25D 2317/062; F25D 11/02; F25D 2323/021; F25C 5/22; F25C 2400/10
See application file for complete search history.

(56) References Cited

U.S. PATENT DOCUMENTS

| | | | |
|---|---|---|---|
| 7,942,017 B2 | 5/2011 | Lee et al. | |
| 8,707,724 B2 | 4/2014 | Kim et al. | |
| 8,943,852 B2 | 2/2015 | Lee et al. | |
| 9,175,896 B2 | 11/2015 | Choi | |
| 9,903,636 B2 | 2/2018 | Koo | |
| 10,670,320 B2 | 6/2020 | Lee et al. | |
| 2010/0147009 A1* | 6/2010 | Kim .......................... | F25C 1/00 62/340 |
| 2011/0146331 A1 | 6/2011 | Moon et al. | |
| 2016/0370089 A1* | 12/2016 | Koo .......................... | F25C 1/00 |
| 2018/0187942 A1 | 7/2018 | Hong et al. | |

FOREIGN PATENT DOCUMENTS

KR 101694401 B1 1/2017

* cited by examiner

*Primary Examiner* — Elizabeth J Martin
(74) *Attorney, Agent, or Firm* — Price Heneveld LLP

(57) ABSTRACT

A refrigeration appliance includes a cabinet that defines a cabinet outlet and a cabinet inlet in fluid communication with a freezer compartment. A door is pivotally coupled to the cabinet. The door defines a door inlet in fluid communication with the cabinet outlet and a door outlet in fluid communication with the cabinet inlet when the door is in a closed position. An icemaker compartment is disposed in the door. The icemaker compartment is fluidly coupled with the freezer compartment. A retainer is at least partially disposed in each of the door inlet and the door outlet. Each retainer includes a rim that defines ribs. Each rib is spaced apart from adjacent ribs. A gasket is coupled to each retainer. Each gasket includes an abutment surface that abuts a cabinet surface when the door is in the closed position to seal airflow passages between the freezer compartment and the icemaker compartment.

18 Claims, 11 Drawing Sheets

DOOR VENT SEALING ASSEMBLY

BACKGROUND OF THE DISCLOSURE

The present disclosure generally relates to a door vent sealing assembly, and more specifically, to a door vent sealing assembly for a refrigerator.

SUMMARY OF THE DISCLOSURE

According to one aspect of the present disclosure, a refrigeration appliance includes a cabinet that defines a cabinet outlet and a cabinet inlet in fluid communication with a freezer compartment. A door is pivotally coupled to the cabinet. The door defines a door inlet in fluid communication with the cabinet outlet and a door outlet in fluid communication with the cabinet inlet when the door is in a closed position. An icemaker compartment is disposed in the door. The icemaker compartment is fluidly coupled with the freezer compartment. A retainer is at least partially disposed in each of the door inlet and the door outlet. Each retainer includes a rim that defines ribs. Each rib is spaced apart from adjacent ribs. A gasket is coupled to each retainer. Each gasket includes an abutment surface that abuts a cabinet surface when the door is in the closed position to seal airflow passages between the freezer compartment and the icemaker compartment.

According to another aspect of the present disclosure, an appliance door includes a panel that defines an inlet and an outlet adjacent to the inlet. An icemaker compartment is fluidly coupled to the inlet via an air duct and fluidly coupled to the outlet via a return duct. At least one retainer is disposed adjacent to one of the inlet and the outlet. The at least one retainer includes an insertion wall that extends through the panel and a rim that extends over the panel. The rim defines ribs. Each rib is spaced from adjacent ribs. At least one gasket is coupled to the at least one retainer. The at least one gasket compresses toward the at least one retainer. The ribs maintain a space within the at least one gasket to prevent a vacuum suction effect.

According to yet another aspect of the present disclosure, a door vent sealing assembly for an appliance includes a retainer that has an insertion wall at least partially defining an aperture. The insertion wall defines coupling features on opposing sides of the retainer to engage a duct. A rim is coupled to the insertion wall. The rim extends perpendicular to the insertion wall and outward from the aperture. The rim includes an engagement surface that defines ribs. A gasket has a coupling portion for receiving the rim to couple the gasket to the retainer and a sealing member spaced from and extending over the rim. The ribs maintain space within the gasket when the gasket is in a compressed state to prevent a vacuum suction effect.

These and other features, advantages, and objects of the present disclosure will be further understood and appreciated by those skilled in the art by reference to the following specification, claims, and appended drawings.

Figure 1:
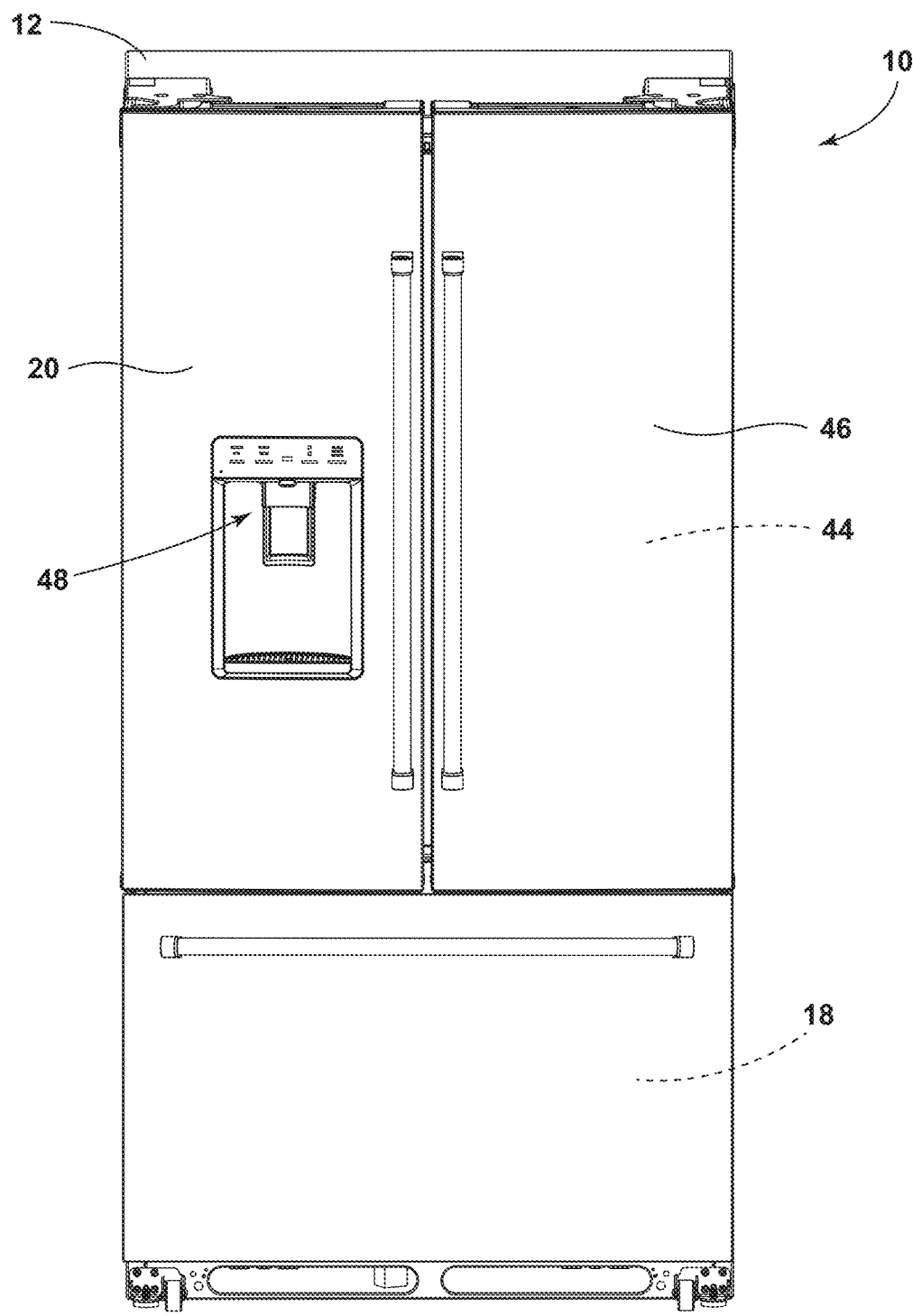
FIG. 1 is a front perspective view of a refrigerator, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a door vent sealing assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates an appliance, such as a refrigerator. The refrigerator 10 includes a cabinet 12 that defines a cabinet outlet 14 and a cabinet inlet 16 each in fluid communication with a freezer compartment 18. A door 20 is pivotally coupled to the cabinet 12. The door 20 defines a door inlet 22 and a door outlet 24. The door inlet 22 is in fluid communication with the cabinet outlet 14 and the door outlet 24 is in fluid communication with the door inlet 22 when the door 20 is in a closed position. An icemaker compartment 26 is disposed in the door 20. The icemaker compartment 26 is fluidly coupled with the freezer compartment 18. Retainers 28, 30 are at least partially disposed in each of the door inlet 22 and the door outlet 24, respectively. Each retainer 28, 30 includes a rim 32 that defines ribs 34. Each rib 34 is spaced apart from adjacent ribs 34. Gaskets 36, 38 are coupled to the retainers 28, 30, respectively. Each gasket 36, 38 includes an abutment surface 40 that abuts a cabinet surface 42 when the door 20 is in the closed position to seal airflow passages between the freezer compartment 18 and the icemaker compartment 26.

Figure 2:
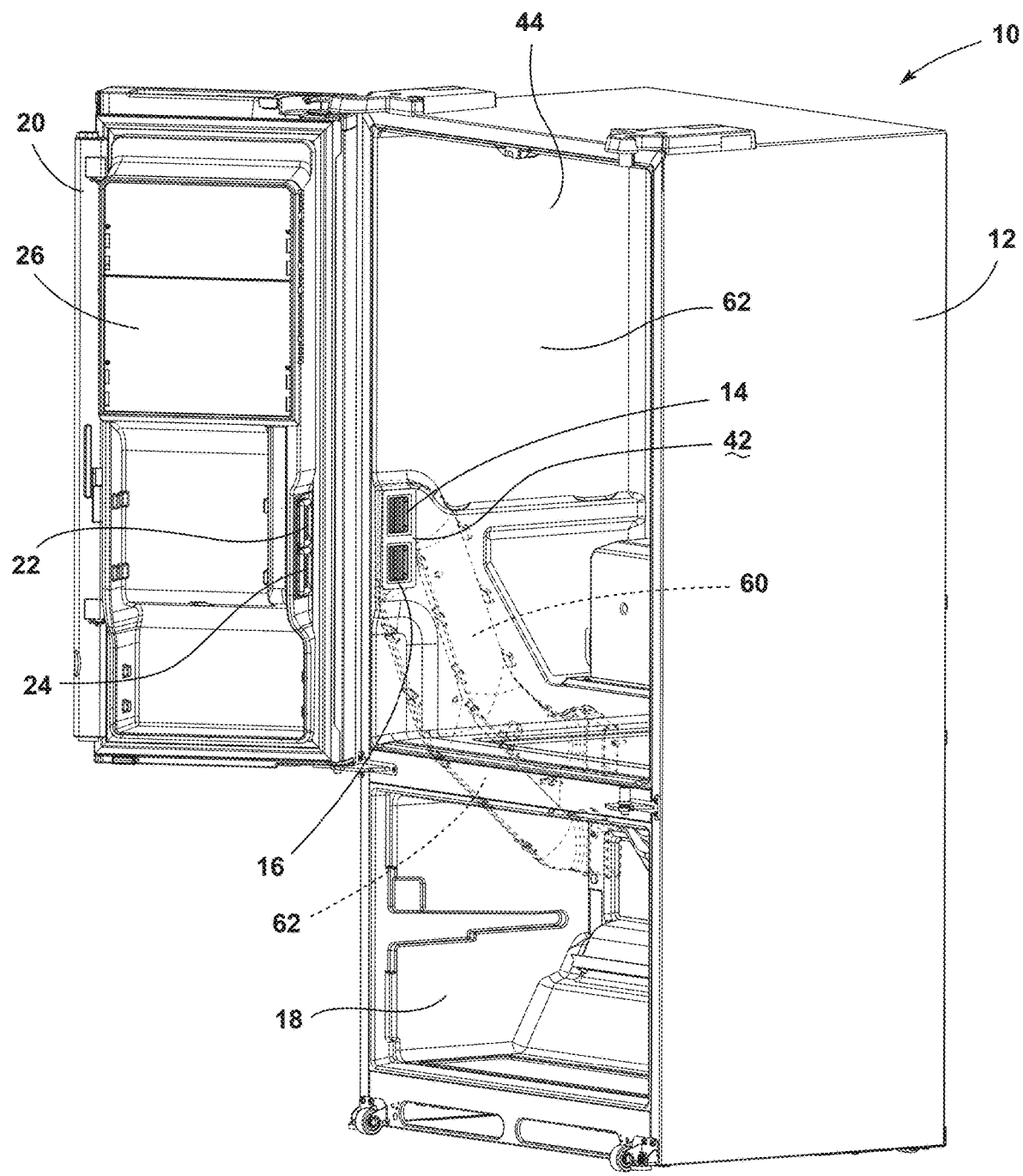
FIG. 2 is a front perspective view of a refrigerator with one door in an opened position and other doors removed, according to the present disclosure.

Referring to FIGS. 1 and 2, the refrigerator 10 has a refrigeration compartment 44 and the freezer compartment 18. The refrigerator 10 is illustrated as a French door bottom mount refrigerator. Accordingly, in the illustrated configuration, the refrigerator 10 includes two doors 20, 46 for accessing the refrigeration compartment 44, which is disposed vertically above the freezer compartment 18. A water dispenser 48 is disposed on a front surface of the door 20 that has the icemaker compartment 26. It is contemplated that the refrigerator 10 may be any configuration of a refrigeration appliance, for example, a bottom mount refrigerator, top mount refrigerator, a side-by-side refrigerator, a four-door French door refrigerator, a five-door French door refrigerator, etc.

Figure 3:
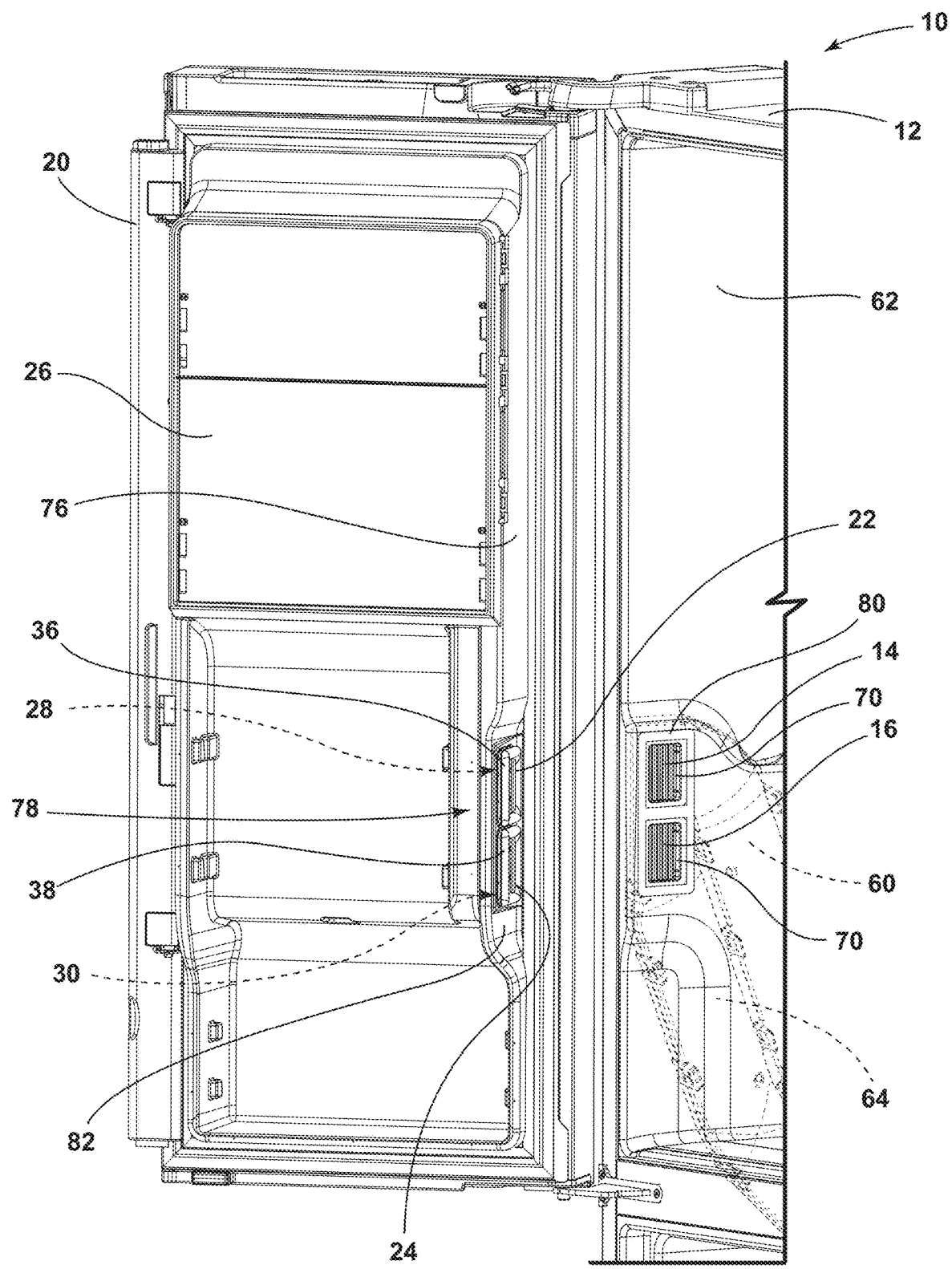
FIG. 3 is a side perspective view of a sealing assembly on a refrigerator door, according to the present disclosure.

Referring still to FIG. 2, as well as FIG. 3, the icemaker compartment 26 is disposed within the door 20 of the refrigerator 10. The icemaker compartment 26 receives air from the freezer compartment 18 via an air duct 60. The air duct 60 extends from the freezer compartment 18 to the cabinet outlet 14 defined by a sidewall 62 of the cabinet 12. A return duct 64 extends between the cabinet inlet 16 and the freezer compartment 18 to deliver warmer air from the icemaker compartment 26 to the freezer compartment 18. The air duct 60 and the return duct 64 generally extend within or behind the sidewall 62 of the cabinet 12. It is contemplated that the air duct 60 and the return duct 64 may be disposed between an inner liner and an outer wrapper of the refrigerator 10.

The cabinet outlet 14 and the cabinet inlet 16 are defined in the sidewall 62 of the refrigerator 10 adjacent to the door 20. It is contemplated that caps 70 with air directing features (e.g., slats or vanes) are coupled to the cabinet 12 and disposed around the cabinet outlet 14 and the cabinet inlet 16, respectively. The cabinet inlet 16 and the cabinet outlet 14 align with the door outlet 24 and the door inlet 22, respectively, when the door 20 is in the closed position. The door inlet 22 and the door outlet 24 are defined in a side panel 76 of the door 20, which faces the sidewall 62 of the cabinet 12 when the door 20 is in the closed position. The positioning of the cabinet outlet 14, the cabinet inlet 16, the door inlet 22, and the door outlet 24 provides the airflow passages between the icemaker compartment 26 and the freezer compartment 18 while minimizing interference with a storage space within the refrigerator 10.

Additionally or alternatively, the cabinet 12 defines a protruding portion 80 that is offset from the remainder of the sidewall 62. The cabinet outlet 14 and the cabinet inlet 16 are defined in the protruding portion 80. The side panel 76 of the door 20 includes a recessed region 82 that is offset from the remainder of the side panel 76. The door inlet 22 and the door outlet 24 are defined in the recessed region 82. When the door 20 is in the closed position, the protruding portion 80 fits within the recessed region 82. Accordingly, the protruding portion 80 is sized and shaped to mate with the recessed region 82. The protruding portion 80 and the recessed region 82 assist in aligning the door 20 with the cabinet 12 to form the airflow passages, as well as assist with sealing the airflow passages.

Figure 4:
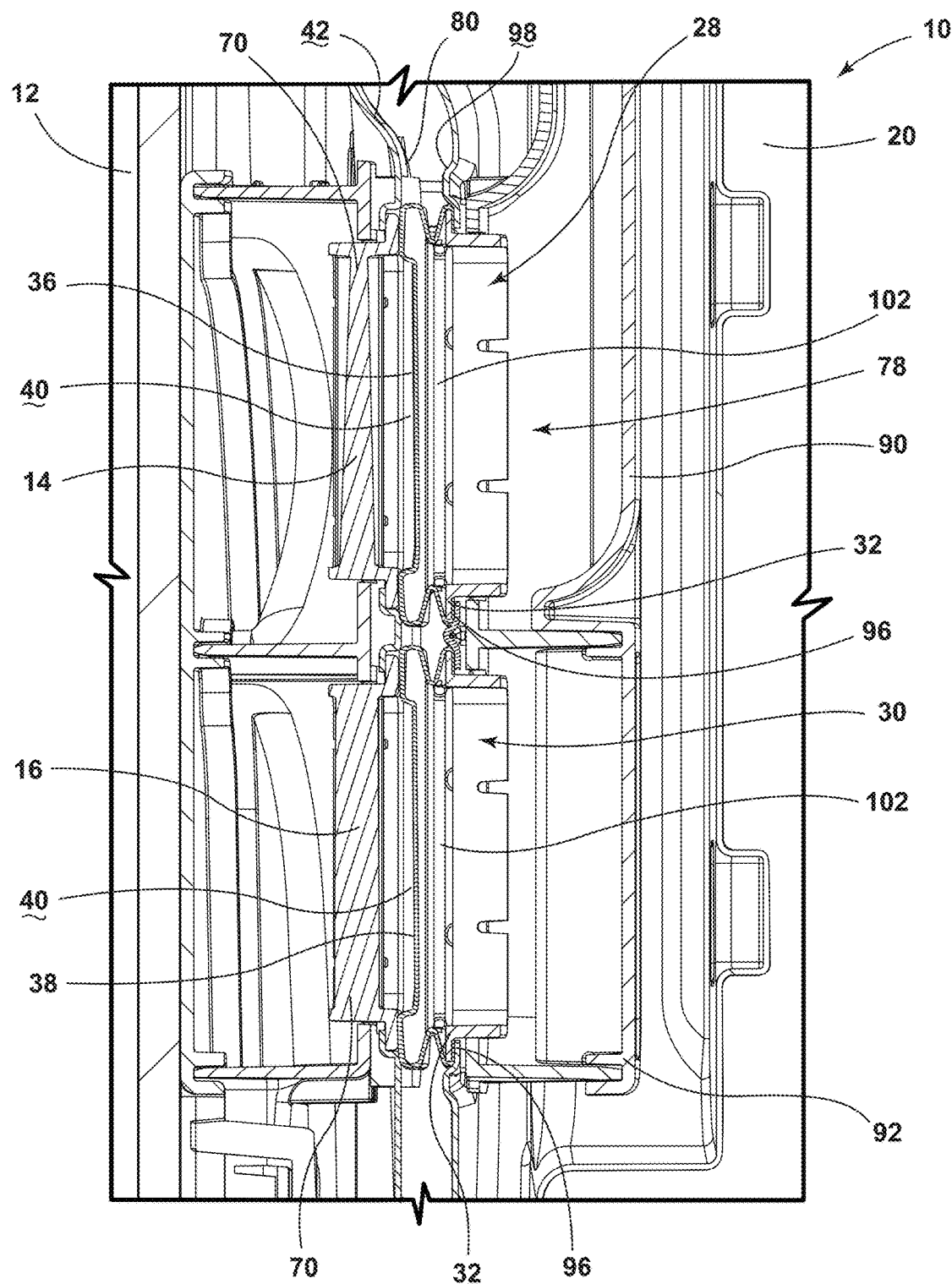
FIG. 4 is a cross-sectional view of a sealing assembly on a door engaging a sidewall of a cabinet when the door is in a closed position, according to the present disclosure.

When the door 20 is in an opened position, as illustrated in FIGS. 2 and 3, the airflow passages are disrupted and the icemaker compartment 26 within the door 20 is not in direct fluid communication with the freezer compartment 18. When the door 20 is in the closed position, as illustrated in FIG. 4, the door inlet 22 is in direct fluid communication with the cabinet outlet 14, and the door outlet 24 is in direct fluid communication with the cabinet inlet 16. The door 20 includes an air duct 90 to direct air from the door inlet 22 to the icemaker compartment 26, as well as a return duct 92 to direct air from the icemaker compartment 26 to the door outlet 24. The air duct 90 is generally disposed adjacent to the return duct 92, with the air duct 90 and the return duct 92 extending along an interior surface of the side panel 76 of the door 20.

Referring still to FIG. 4, when the door 20 is in the closed position, cold air is directed from the freezer compartment 18 through the air duct 60, through the cabinet outlet 14, through the door inlet 22, through the air duct 90, and into the icemaker compartment 26. This forms an air delivery passage to direct cold air from the freezer compartment 18 to the icemaker compartment 26 within the door 20. The cold air from the freezer compartment 18 is utilized for ice-making and ice storage within the door 20. Once the air warms, the air travels through an air return passage to return to the freezer compartment 18 or a machine compartment to be cooled again. When the door 20 is in the closed position, the warm air travels from the icemaker compartment 26, though the return duct 92, exits the door 20 through the door outlet 24, travels through the cabinet inlet 16, through the return duct 64, and returns to the freezer compartment 18. Accordingly, the refrigerator 10 provides continuous airflow along the airflow passages between the icemaker compartment 26 and the freezer compartment 18 when the door 20 is in the closed position.

Figure 5:
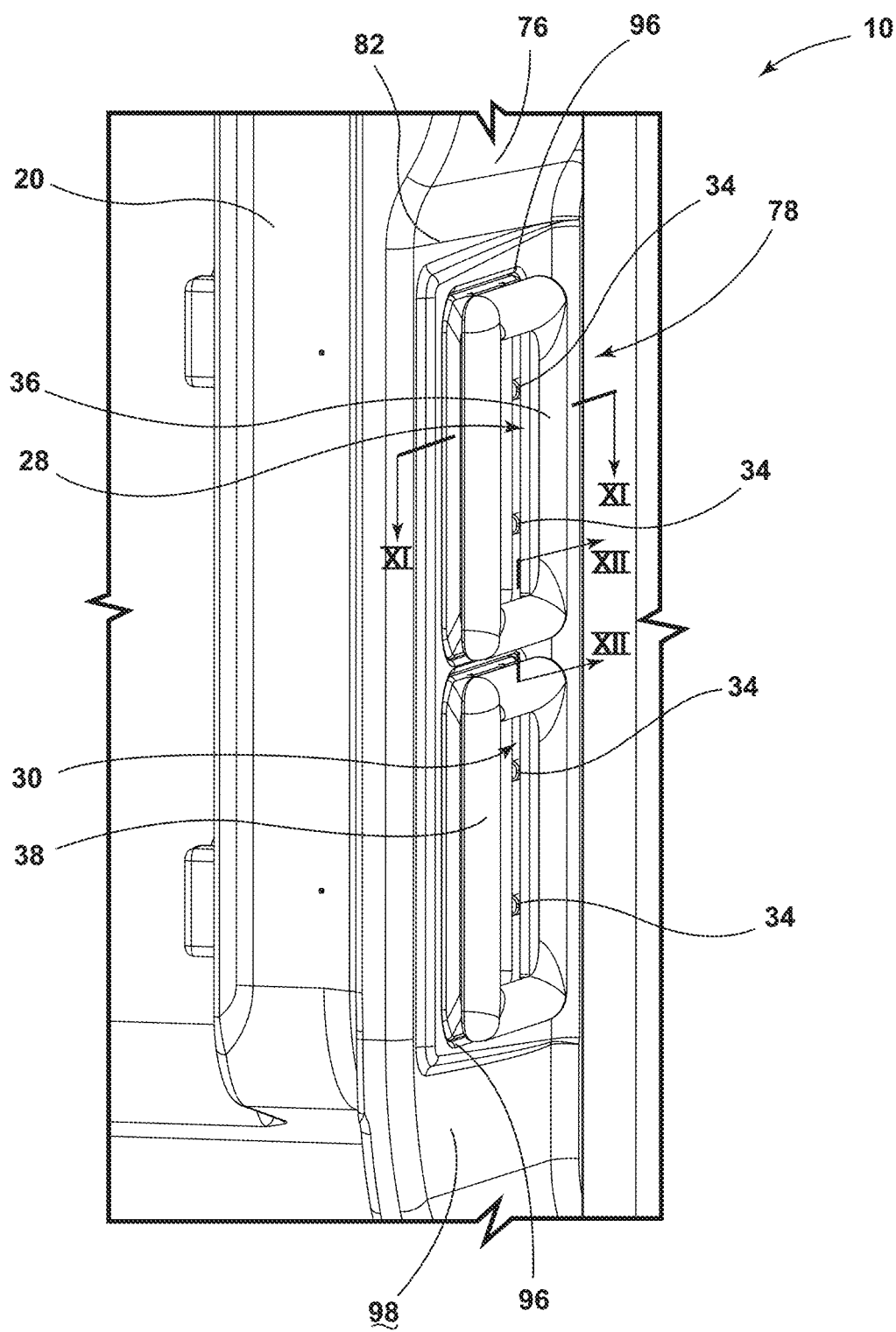
FIG. 5 is a side perspective view of a sealing assembly on a refrigerator door, according to the present disclosure.

Referring still FIG. 4, as well as FIG. 5, a door vent sealing assembly 78 is utilized to seal the airflow passages (e.g., the air delivery passage and the air return passage) between the ice making compartment 26 and the freezer compartment 18. This seal is advantageous for minimizing or preventing air from escaping the airflow passages and entering the refrigeration compartment 44. Generally, the refrigeration compartment 44 is maintained in a temperature range of about 35° F. to about 45° F. The freezer compartment 18 is generally maintained at or below about 32° F. Accordingly, the air being directed from the freezer compartment 18 to the icemaker compartment 26 is at a temperature below the temperature of the refrigeration compartment 44. If air from the airflow passages escapes into the refrigeration compartment 44, the temperature of the refrigeration compartment 44 may be lowered below the predetermined range (e.g., between about 35° F. and about 45° F.), which affects food stored within the refrigeration compartment 44. Additionally or alternatively, the cold air escaping the airflow passages may affect the function of a water filter within the refrigeration compartment 44 or the water dispenser 48 by causing water within the water filter or the water dispenser 48 to at least partially freeze.

The door vent sealing assembly 78 includes the retainers 28, 30 and the gaskets 36, 38. The retainer 28 is coupled to the side panel 76 of the door 20 adjacent to the door inlet 22, and the gasket 36 is coupled to the retainer 28. The retainer 30 is coupled to the side panel 76 adjacent to the door outlet 24, and the gasket 38 is coupled to the retainer 30. The retainer 30 is generally disposed vertically below the retainer 28. Additionally or alternatively, the side panel 76 of the door 20 defines recessed portions 96 within the recessed region 82 around each of the door inlet 22 and the door outlet 24. The rim 32 of each retainer 28, 30 is generally at least partially disposed within the respective recessed portion 96. Accordingly, the rim 32 of each retainer 28, 30 is generally flush with a surface 98 of the side panel 76 adjacent to the recessed portions 96.

Referring still to FIGS. 4 and 5, the gaskets 36, 38 are coupled to the rim 32 of the respective retainer 28, 30 and extend away from the surface 98 of the side panel 76 to engage the cabinet 12. When the doors are in the closed position, the abutment surface 40 of each gasket 36, 38 abuts the cabinet surface 42 to seal the airflow passages. The abutment surface 40 of each gasket 36, 38 engages a flat portion of cabinet surface 42 on the protruding portion 80 of the sidewall 62. The gaskets 36, 38 slightly compress between the side panel 76 of the door 20 and the sidewall 62 of the cabinet 12. The slight compression of the gaskets 36, 38 maintains the seal between the cabinet outlet 14 and the door inlet 22, as well as between the door inlet 22 and the door outlet 24. It is contemplated that the gaskets 36, 38 may engage the caps 70 or other air directing feature disposed within the cabinet inlet 16 and the cabinet outlet 14. In such configurations, the caps 70 and the cabinet surface 42 define a substantially flat surface for the gaskets 36, 38 to engage. It is also contemplated that the retainer 28 and retainer 30 are substantially identical and the gasket 36 and the gasket 38 are substantially identical to provide substantially similar sealing effects around the door inlet 22 and the door outlet 24.

Figure 6:
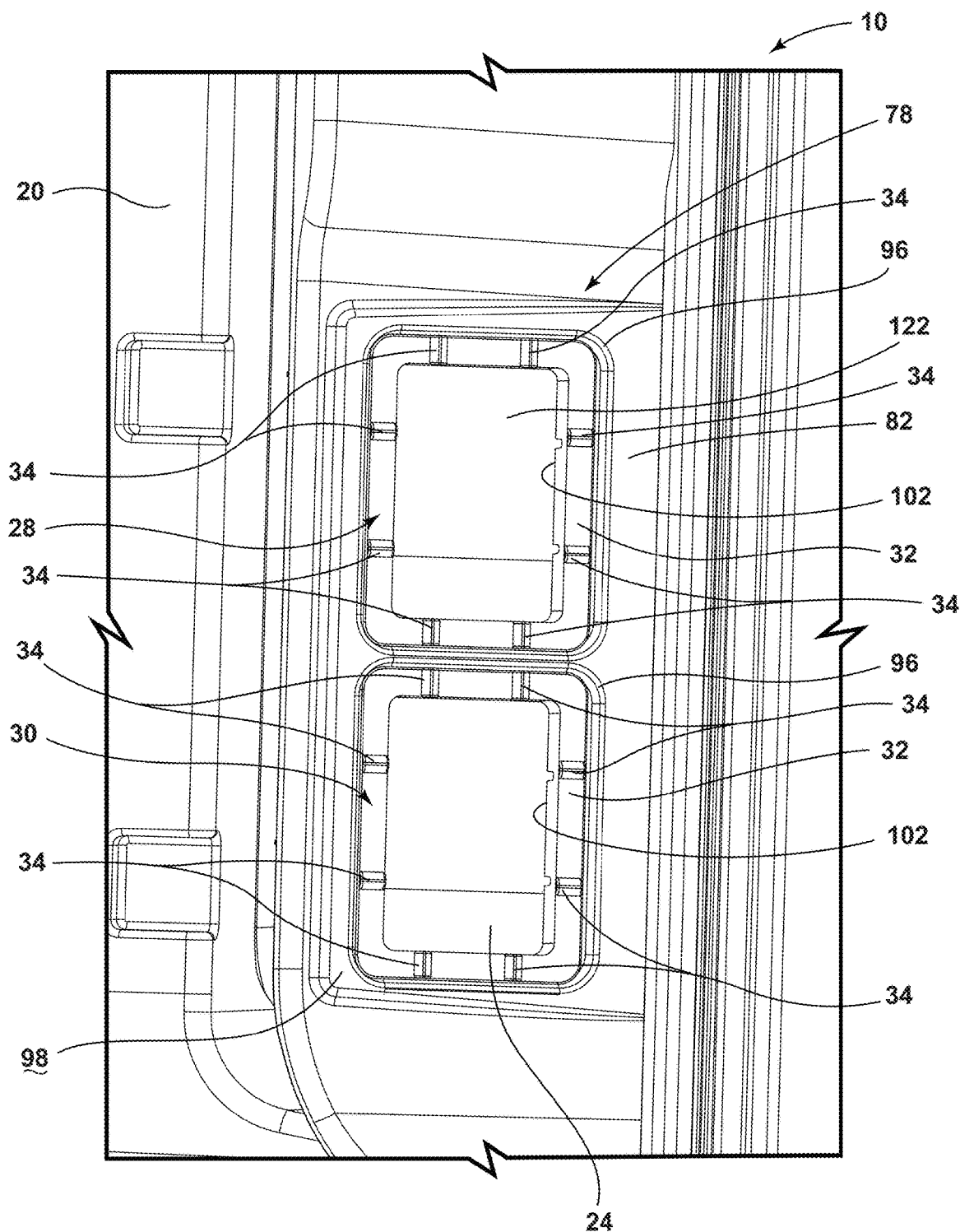
FIG. 6 is a front perspective view of retainers of a sealing assembly on a refrigerator door around an inlet and an outlet, according to the present disclosure.

Referring still to FIG. 4, as well as FIG. 6, the retainers 28, 30 extend entirely around the door inlet 22 and the door outlet 24, respectively. Each retainer 28, 30 includes an insertion wall 102 that at least partially extends through the side panel 76 in the door inlet 22 or the door outlet 24, respectively. The rim 32 of each retainer 28, 30 extends from the respective insertion wall 102 and over the surface 98 of the side panel 76. The insertion walls 102 abut edges of the side panel 76 that define the door inlet 22 and the door outlet 24, respectively, to maximize the air passages to and from the icemaker compartment 26.

Figure 7:
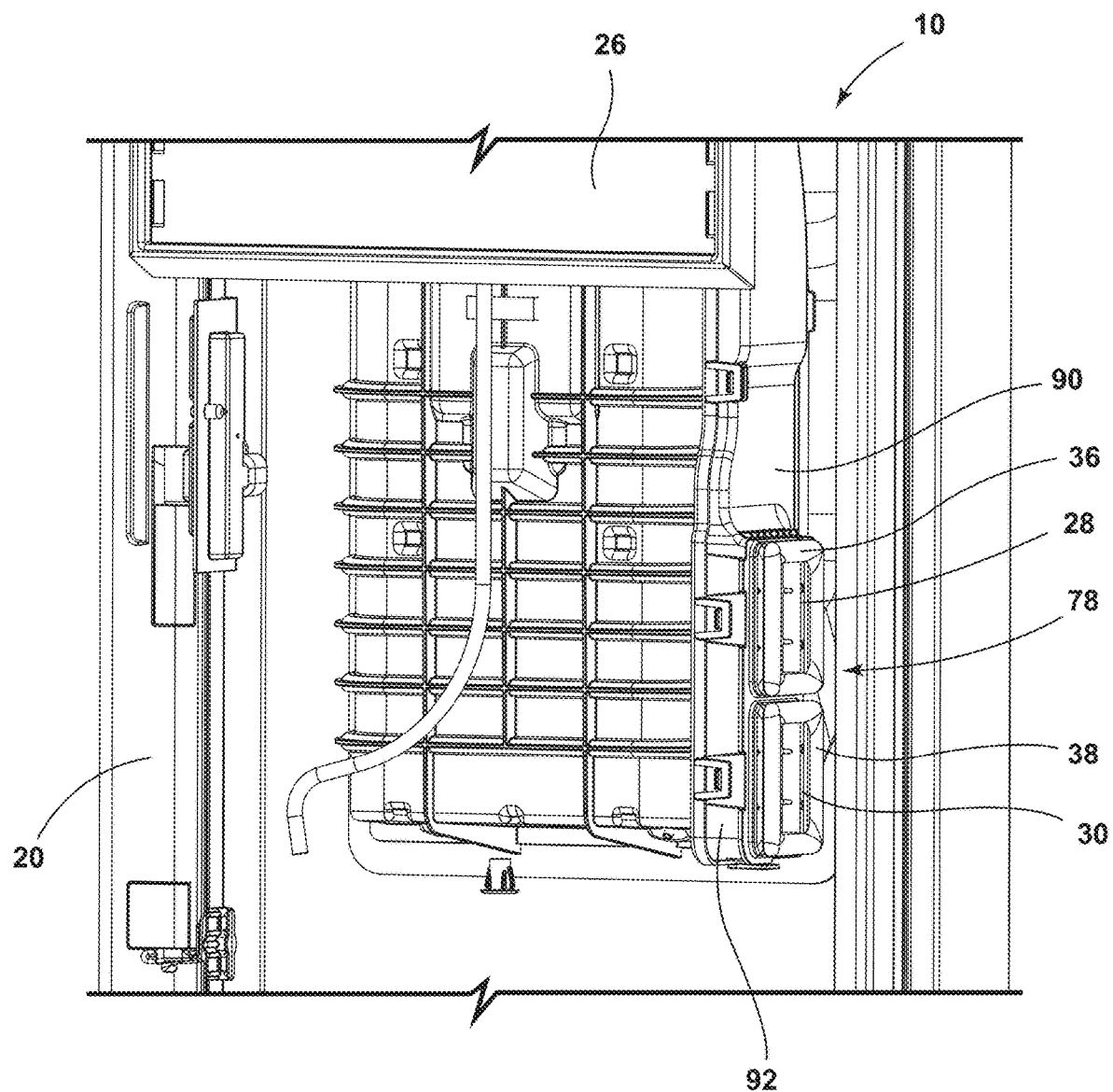
FIG. 7 is a side perspective view of a sealing assembly for a refrigerator door coupled with ducts within the refrigerator door and where a panel of the refrigerator door has been removed, according to the present disclosure.
Figure 8:
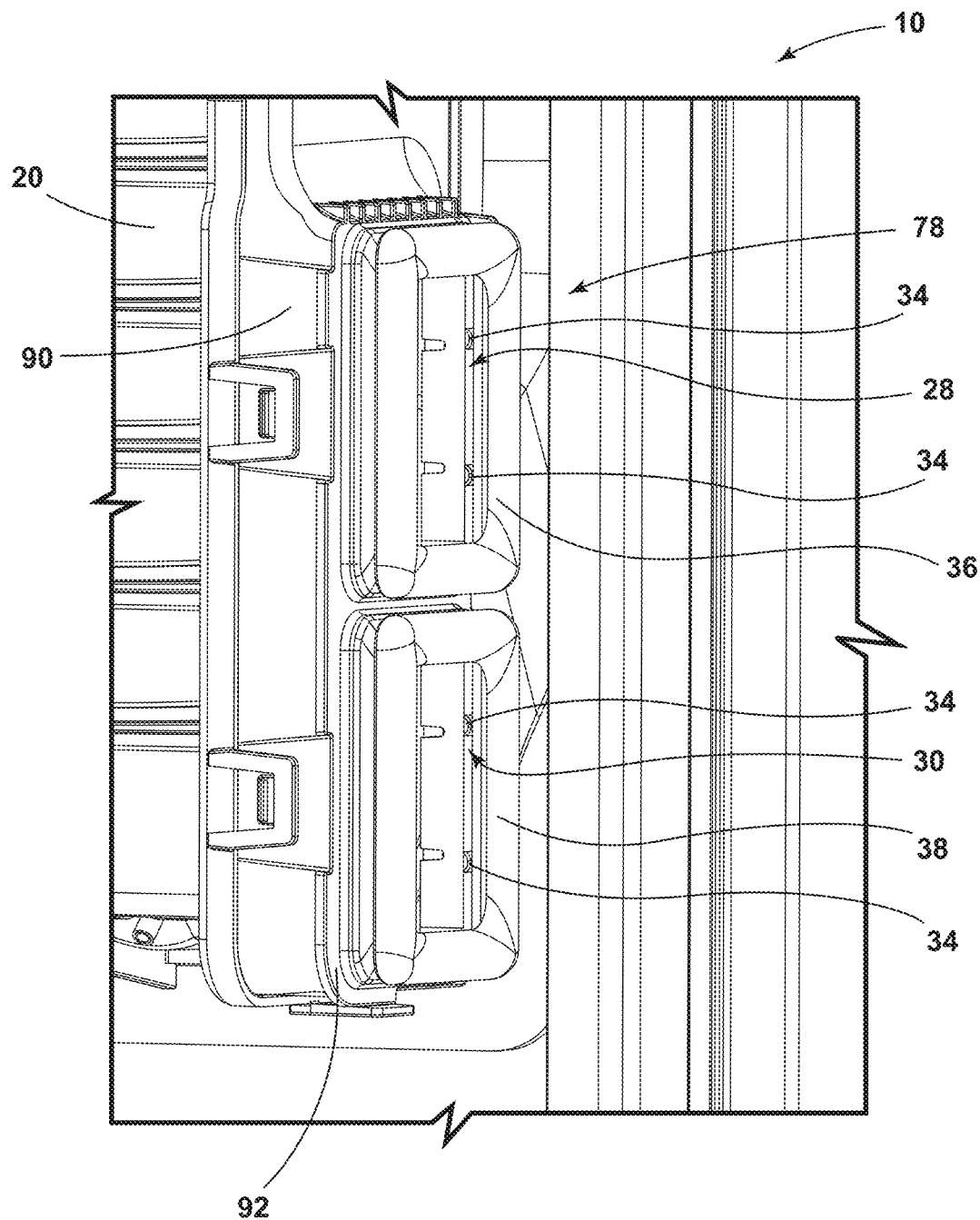
FIG. 8 is a side perspective view of a sealing assembly for a refrigerator door coupled with ducts within the refrigerator door, according to the present disclosure.
Figure 9:
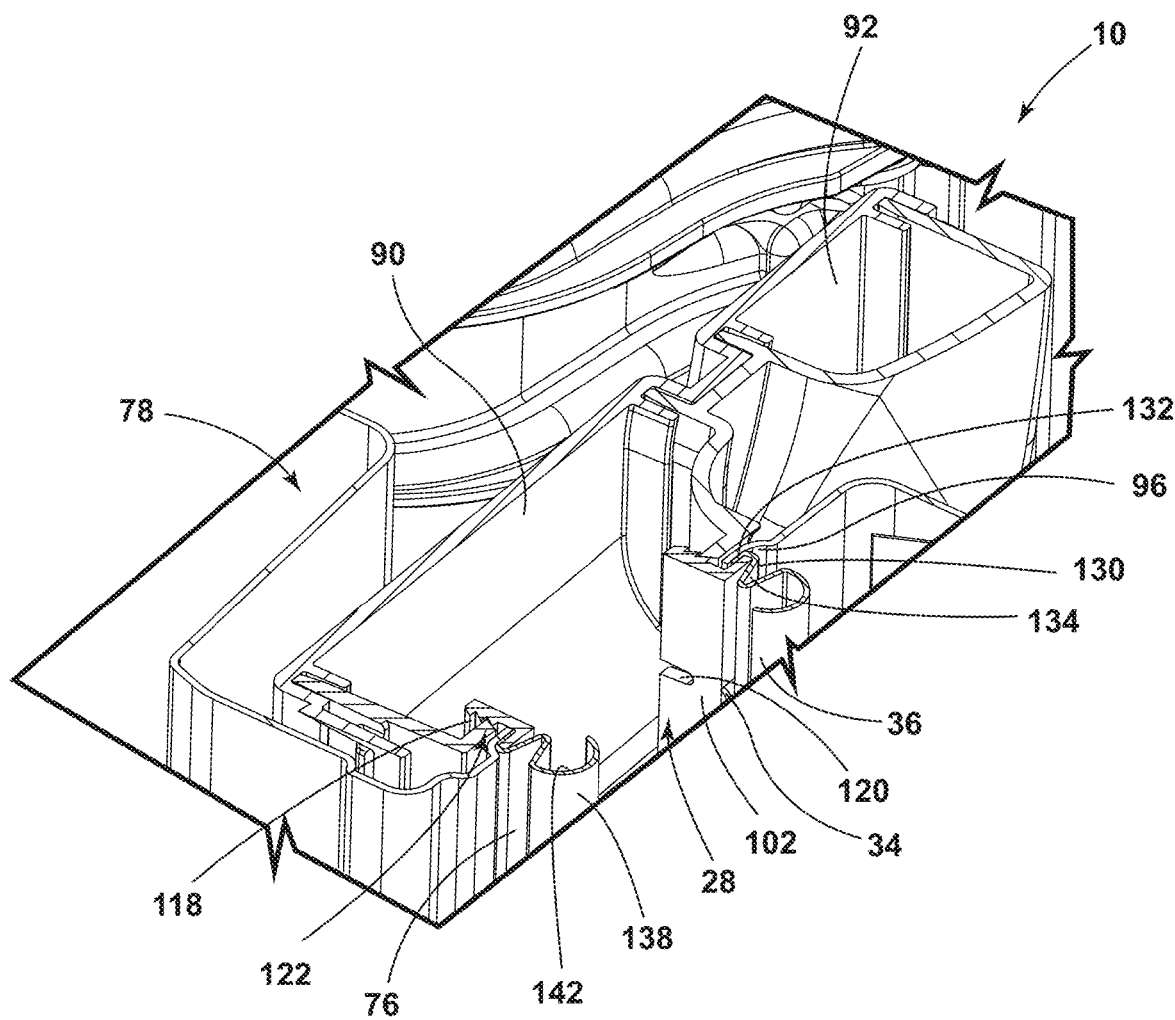
FIG. 9 is a cross-sectional view of an interface between a retainer, a gasket, and a duct of the sealing assembly of FIG. 5, taken along line IX-IX.

Referring to FIGS. 7-9, each retainer 28, 30 is directly coupled to a duct within the door 20. The retainer 28 disposed around the door inlet 22 is coupled to the air duct 90 that fluidly couples the door inlet 22 with the icemaker compartment 26. The retainer 30 disposed around the door outlet 24 is coupled to the return duct 92, which extends between the icemaker compartment 26 and the door outlet 24. Each insertion wall 102 generally includes upper and lower wall portions 110, 112 and lateral wall portions 114, 116 extending between the upper and lower wall portions 110, 112. The upper and lower wall portions 110, 112 and the lateral wall portions 114, 116 are integrally formed to define the insertion wall 102, which extends around the entire door inlet 22 or the entire door outlet 24, respectively.

The lateral wall portions 114, 116 define coupling features 118 on opposing sides of the retainer 28 to engage the air duct 90 or the return duct 92, respectively. The lateral wall portions 114, 116 define notches 120 on each side of the coupling features 118 to allow for slight deformation of the coupling features 118 inward toward the opposing coupling feature 118. As best illustrated in FIG. 9, the coupling features 118 of the retainer 28 include a plurality of teeth 122 configured to interlock with edges of the air duct 90. The notches 120 allow the coupling features 118 to deform inwards as the teeth 122 are moved in relation to the edge of the air duct 90 to form the interlocking connection. The teeth 122 are generally arranged to allow insertion of the retainer 28 into the air duct 90 and prevent removal of the retainer 28. It is contemplated that the retainer 30 engages the return duct 92 in a similar manner with the coupling features 118 having the plurality of teeth 122.

Referring still to FIG. 9, an interface between the gasket 36, the retainer 28, and the air duct 90 is illustrated, and it is understood that the gasket 38, the retainer 30, and the return duct 92 are configured in a similar manner. The insertion wall 102 extends into the air duct 90 and the rim 32 extends from the insertion wall 102. The rim 32 extends substantially perpendicular to the insertion wall 102 and extends over the surface 98 of the side panel 76 of the door 20 within the respective recessed portion 96.

The gasket 36 is coupled to the retainer 28 by a coupling portion 130 of the gasket 36 that receives the rim 32. The coupling portion 130 includes a first extension 132 that extends along an underside of the rim 32 between the rim 32 of the retainer 28 and the surface 98 of the side panel 76. A second extension 134 of the coupling portion 130 extends over the rim 32. Accordingly, the coupling portion 130 is generally U-shaped extending around an outer edge 136 of the rim 32 of the retainer 28. The rim 32 generally has a width slightly larger than a width of the coupling portion 130 to provide a secure fit of the gasket 36 to the retainer 28. It is contemplated that a length or height of the retainer 28 and the gasket 36 may have a similar relationship.

A sealing member 138 of the gasket 36 extends from the second extension 134 of the coupling portion 130. The sealing member 138 of the gasket 36 is a generally C-shaped, curving toward an inner edge 142 of the rim 32. The sealing member 138 is generally spaced apart from the rim 32 and defines an inner channel 142. The abutment surface 40 on the sealing member 138 is configured to compress into the inner channel 142 when the door 20 is in the closed position. The inner channel 142 provides space for the compression and movement of the gasket 36.

Figure 10:
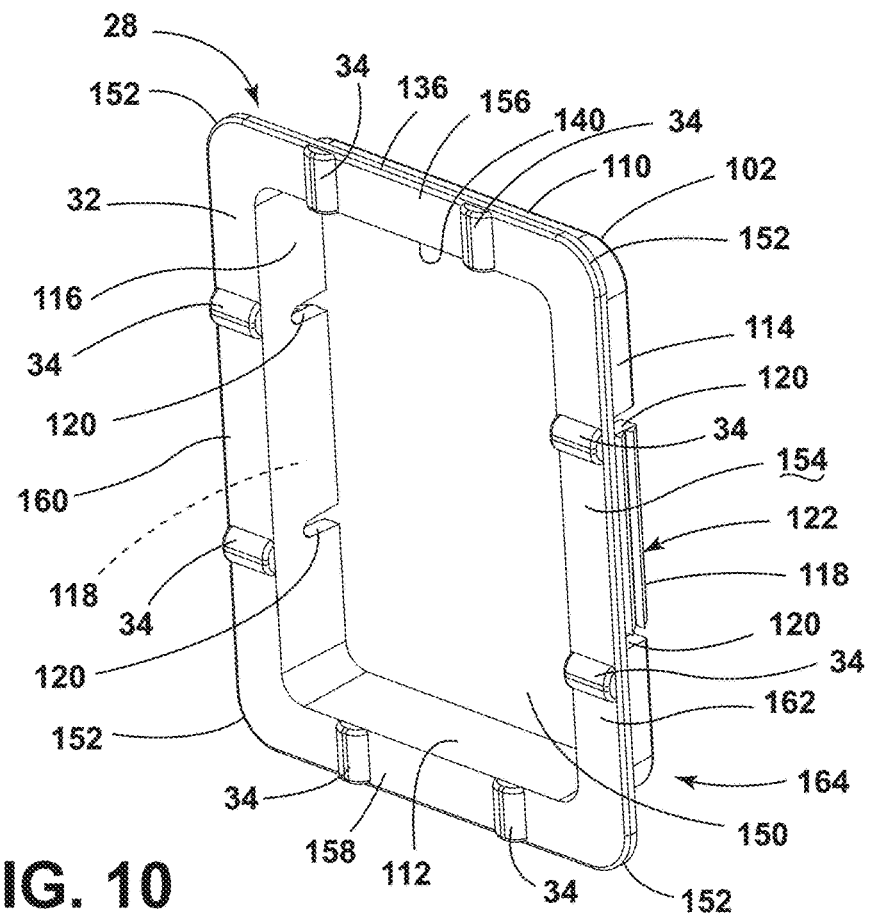
FIG. 10 is a front perspective view of a retainer for a refrigerator door sealing assembly, according to the present disclosure.
Figure 11:
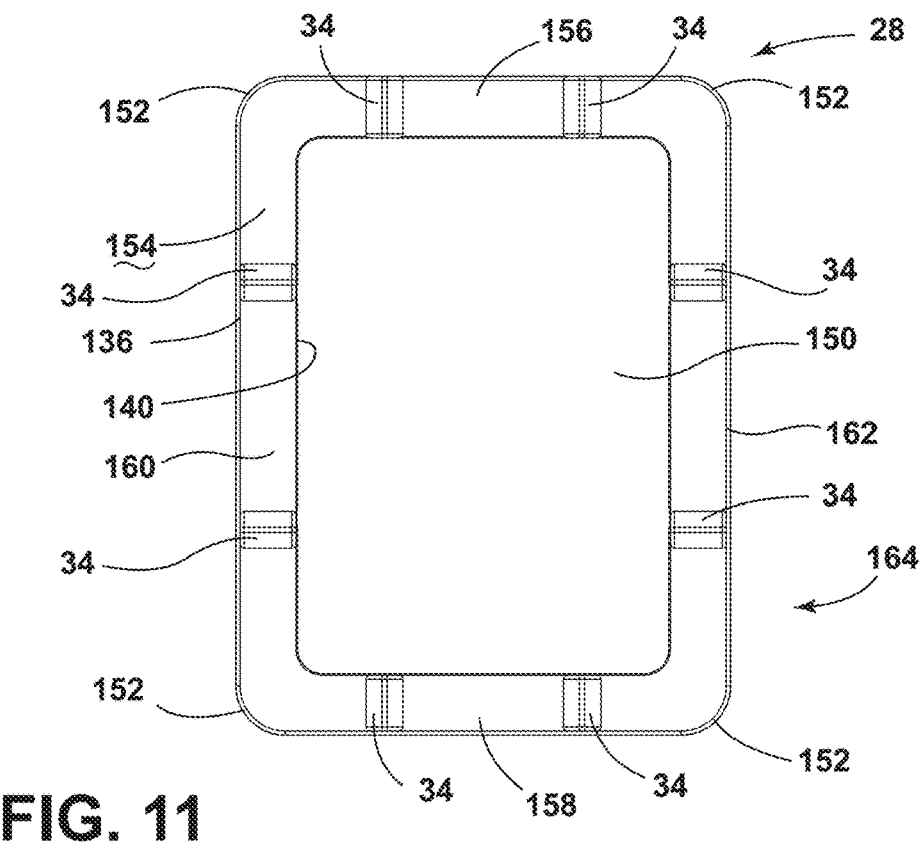
FIG. 11 is a front elevational view of the retainer of FIG. 10.

Referring to FIGS. 10 and 11, the retainer 28 is illustrated with the understanding that the retainer 30 has a substantially similar configuration. The retainer 28 includes the insertion wall 102 having the coupling features 118 on the lateral wall portions 114, 116 and separated from the remainder of the lateral wall portions 114, 116 by the notches 120. The insertion wall 102 at least partially defines an aperture 150 that aligns with the door inlet 22 to define the airflow passage to the icemaker compartment 26. The insertion wall 102 generally has the same shape as the door inlet 22 to prevent air from escaping into the refrigeration compartment 44 or elsewhere in the door 20. The rim 32 is coupled to an entire perimeter of the insertion wall 102. The rim 32 extends substantially perpendicular to the insertion wall 102 and outward from the aperture 150. Each corner 152 of the retainer 28 is rounded, which may reduce manufacturing and production costs and reduce sharp corners in a location on the refrigerator 10 accessible to a user.

The retainer 28 has an engagement surface 154 configured to engage the gasket 36. The engagement surface 154 defines the ribs 34. Each rib 34 is spaced apart from adjacent ribs 34, and the ribs 34 are arranged on the rim 32 around the aperture 150. As illustrated in FIGS. 10 and 11, the retainer 28 has a quadrilateral shape, and specifically a rectangular shape. Accordingly, the rim 32 has opposing first and second sides 156, 158, as well as opposing third and fourth sides 160, 162 that extend between the first and second sides 156, 158. The first side 156, the second side 158, the third side 160, and the fourth side 162 are collectively referred to herein as sides 164 of the rim 32. Each side 164 includes at least one rib 34 extending from the engagement surface 154. Generally, the ribs 34 are integrally defined with the retainer 28 through, for example, an injection molding process.

As illustrated in FIGS. 10 and 11, each side 164 defines a first rib 34 that is spaced from and arranged parallel to a second rib 34 on the respective side 164. Each rib 34 extends from the inner edge 142 to the outer edge 136 of the rim 32. The number and configuration of the ribs 34 on the retainer 28 are configured to prevent a vacuum suction effect of the gasket 36 on the retainer 28 when the door 20 is in the closed position. Accordingly, depending on the configuration of the door 20, the refrigerator 10, or other aspects, additional configurations of the ribs 34 on the retainer 28 are contemplated without departing the teachings herein.

In the depicted example, the ribs 34 on the first side 156 are vertically aligned with the ribs 34 on the second side 158. Additionally, the ribs 34 on the third side 160 are horizontally aligned with the ribs 34 on the fourth side 162. The ribs 34 generally have a width in a range from about 3 mm to about 5 mm and a thickness in a range of about 1 mm to about 3 mm. Additionally or alternatively, the ribs 34 are generally rounded. This configuration of the ribs 34 minimizes or prevents the vacuum suction effect, as well as minimizes or prevents wear on the gasket 36 that may occur as the door 20 is repeatedly moved between the opened and closed positions. It is also contemplated that the retainers 28, 30 may include other raised features or extrusions that provide a similar effect on the gaskets 36, 38 without departing from the teachings herein.

Figure 12:
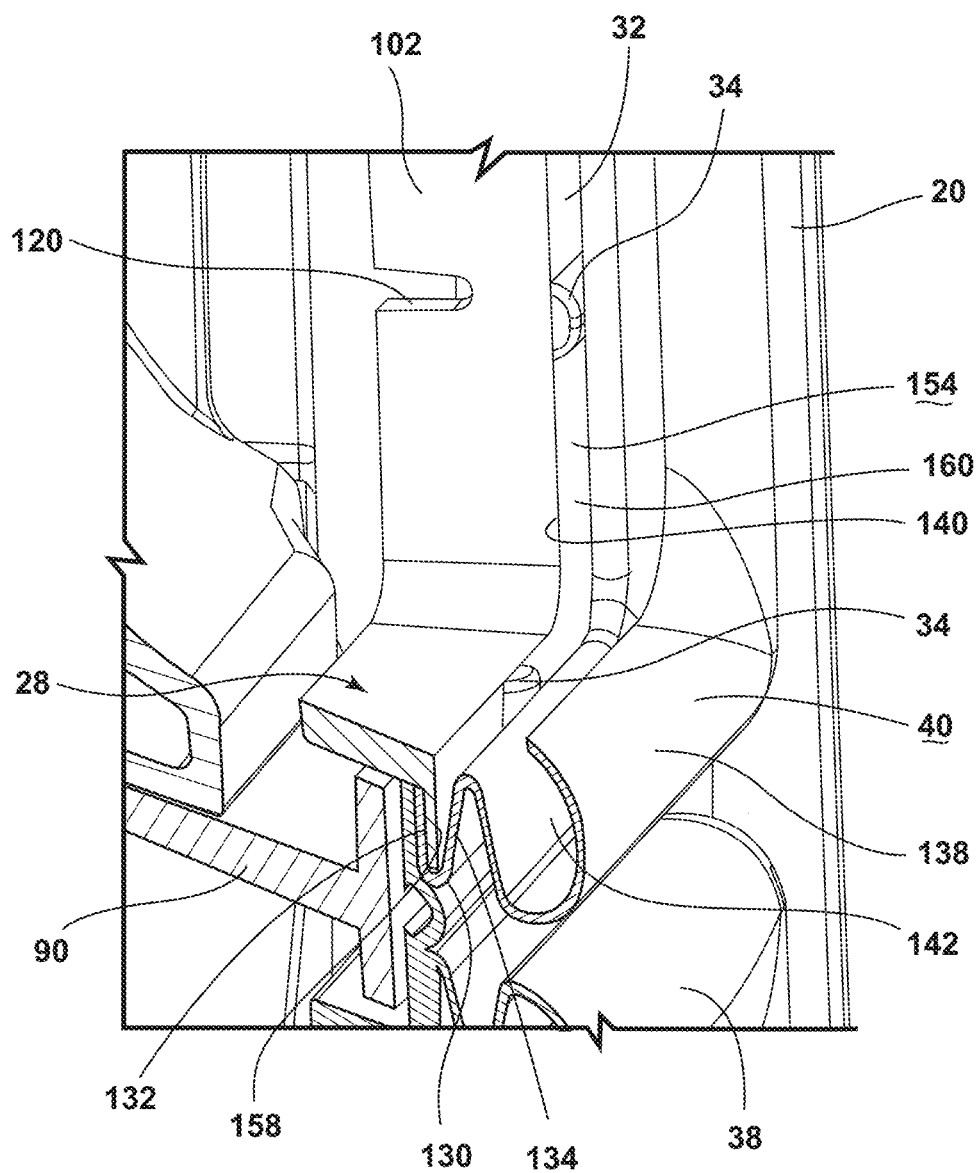
FIG. 12 is a cross-sectional view of an interface between a retainer and a gasket of the sealing assembly of FIG. 5, taken along line XII-XII.

Referring to FIG. 12, the ribs 34 extend from the engagement surface 154 on the rim 32 of the retainer 28 away from the surface 98 of the side panel 76. The ribs 34 are disposed between the first and second extensions 132, 134 of the coupling portion 130 the gasket 36. The ribs 34 maintain space between the second extension 134 and the engagement surface 154 of the rim 32. The space created by the ribs 34 prevents the vacuum suction effect from occurring on the sealing member 138 of the gasket 36.

In conventional sealing assemblies, a seal is compressed to the door when the door is closed against a cabinet due to a vacuum effect. As the door is opened, the seal is retained in the compressed vacuumed state. Accordingly, in conventional seals, when the door is returned to the closed state, the seal remains compressed and, consequently, spaced from the cabinet allowing air to leak into other parts of the refrigerator.

The door vent sealing assembly 78 of the present disclosure includes the ribs 34 to minimize or prevent the vacuum suction effect. Accordingly, when the gasket 36 is compressed due to the door 20 being in the closed position, the vacuum suction effect is minimized or prevented by the ribs 34. In such configurations, the ribs 34 maintain space within the gasket 36, thereby allowing the sealing member 138 of the gasket 36 to return to an expanded state, spaced from the rim 32, when the door 20 is moved to the opened position. Accordingly, when the door 20 returns to the closed position, the abutment surface 40 of the gasket 36 once again engages the cabinet 12 to seal the airflow passages between the icemaker compartment 26 and the freezer compartment 18. It is contemplated that the retainer 30 and the gasket 38 have a similar configuration and operate in a similar manner.

Referring to FIGS. 1-12, the door vent sealing assembly 78 maintains the seal between the door inlet 22 and the cabinet outlet 14, as well as between the door outlet 24 and the cabinet inlet 16. The door vent sealing assembly 78 seals the airflow passages extending between the icemaker compartment 26 and the freezer compartment 18 to prevent air from escaping into the refrigeration compartment 44. The gaskets 36, 38 are each operable between the compressed state when the door 20 is in the closed position and the expanded state when the door 20 is in the opened position. The space maintained by the ribs 34 within the gaskets 36, 38 allows the gasket 36, 38 to adjust between the compressed and expanded states as the door 20 is opened and closed. Accordingly, the ribs 34 minimize or prevent the vacuum suction effect on the gaskets 36, 38 that prevents sealing between the door 20 and the cabinet 12. The seal maintained by the door vent sealing assembly 78 allows a compressor of the refrigerator 10 to operate in a normal state and maintains a selected temperature within the refrigeration compartment 44. When air escapes into the refrigeration compartment 44, the temperature of the refrigeration compartment 44 is lowered, which can cause the compressor of the refrigerator 10 to cycle incorrectly and can impact energy consumption of the refrigerator 10. Accordingly, the door vent sealing assembly 76 may improve (e.g., decrease) energy consumption of the refrigerator 10.

Use of the present device may provide for a variety of advantages. For example, the airflow passages between the freezer compartment 18 and the icemaker compartment 26 in the door 20 may be sealed and maintained. Accordingly, the freezer compartment 18 may be maintained at or below a predetermined temperature, for example at or below about 32° F., and the refrigeration compartment 44 may be maintained in a predetermined temperature range, for example between about 35° F. and about 45° F. Additionally, the sealing provided by the door vent sealing assembly 78 allows the compressor of the refrigerator 10 to operate in a normal state to maintain the refrigeration compartment 44 and the freezer compartment 18 at the selected predetermined temperatures. Also, the door vent sealing assembly 78 includes the retainers 28, 30, which interlockably engage with the air duct 90 and the return duct 92, respectively. Further, the retainers 28, 30 include the rim 32 that defines the ribs 34 that maintain space within the respective gaskets 36, 38. Additionally, the ribs 34 prevent the vacuum suction effect of the gaskets 36, 38 that can reduce the efficiency of, or prevent, the sealing of airflow passages. Further, the retainers 28, 30 include the ribs 34, which allow the gaskets 38, 36 to be adjusted between the compressed state and the expanded state as the door 20 is repeatedly moved between the opened position and the closed position. Also, the ribs 34 reduce wear and tear on the gaskets 36, 38 that can occur from multiple door opening and door closing events of the door 20. Additional benefits or advantages of using this device may also be realized and/or achieved.

According to one aspect of the present disclosure, a refrigeration appliance includes a cabinet that defines a cabinet outlet and a cabinet inlet in fluid communication with a freezer compartment. A door is pivotally coupled to the cabinet. The door defines a door inlet in fluid communication with the cabinet outlet and a door outlet in fluid communication with the cabinet inlet when the door is in a closed position. An icemaker compartment is disposed in the door. The icemaker compartment is fluidly coupled with the freezer compartment. A retainer is at least partially disposed in each of the door inlet and the door outlet. Each retainer includes a rim that defines ribs. Each rib is spaced apart from adjacent ribs. A gasket is coupled to each retainer. Each gasket includes an abutment surface that abuts a cabinet surface when the door is in the closed position to seal airflow passages between the freezer compartment and the icemaker compartment.

According to another aspect, each retainer includes an insertion wall that extends through one of the door inlet and the door outlet, respectively. The insertion wall defines coupling features on opposing sides of the retainer.

According to another aspect, each coupling feature defines a plurality of teeth that interlock with an edge of a duct.

According to another aspect, rims extend at least partially into a space defined by gaskets, respectively, to prevent a vacuum suction effect on the gaskets when a door is in a closed position.

According to another aspect, each gasket includes a sealing member spaced from a respective retainer and defining a channel. Each gasket adjusts to a compressed state when a door is in a closed position.

According to another aspect, ribs maintain space between a gasket and a retainer, respectively, to prevent a vacuum suction effect. Each gasket adjusts from a compressed state to an expanded state when a door is moved to an opened position.

According to another aspect, each rib extends from an inner edge to an outer edge of a rim of a retainer.

According to another aspect, an appliance door includes a panel that defines an inlet and an outlet adjacent to the inlet. An icemaker compartment is fluidly coupled to the inlet via an air duct and fluidly coupled to the outlet via a return duct. At least one retainer is disposed adjacent to one of the inlet and the outlet. The at least one retainer includes an insertion wall that extends through the panel and a rim that extends over the panel. The rim defines ribs. Each rib is spaced from adjacent ribs. At least one gasket is coupled to the at least one retainer. The at least one gasket compresses toward the at least one retainer. The ribs maintain a space within the at least one gasket to prevent a vacuum suction effect.

According to another aspect, at least one retainer includes a first retainer disposed adjacent to an inlet and coupled to an air duct and a second retainer disposed adjacent to an outlet and coupled to a return duct. At least one gasket includes a first gasket coupled to the first retainer and a second gasket coupled to the second retainer.

According to another aspect, each of first and second retainers defines a plurality of teeth for interlocking with edges of an air duct and a return duct, respectively.

According to another aspect, at least one retainer defines a quadrilateral shape. At least two ribs are defined on each side of the at least one retainer. The at least two ribs includes a first rib arranged parallel to a second rib.

According to another aspect, each rib extends from an inner edge to an outer edge of a rim of at least one retainer.

According to another aspect, at least one gasket includes a coupling portion that has a first extension that extends between a panel and a rim and a second extension that extends over the rim and ribs. The ribs maintain a space between the first and second extensions.

According to another aspect, at least one gasket is operable between a compressed state and an expanded state. Ribs disposed between first and second extensions of a coupling portion prevent a vacuum suction effect on at least gasket allowing the at least one gasket to adjust to the expanded state from the compressed state.

According to another aspect, a door vent sealing assembly for an appliance includes a retainer that has an insertion wall at least partially defining an aperture. The insertion wall defines coupling features on opposing sides of the retainer to engage a duct. A rim is coupled to the insertion wall. The rim extends perpendicular to the insertion wall and outward from the aperture. The rim includes an engagement surface that defines ribs. A gasket has a coupling portion for receiving the rim to couple the gasket to the retainer and a sealing member spaced from and extending over the rim. The ribs maintain space within the gasket when the gasket is in a compressed state to prevent a vacuum suction effect.

According to another aspect, each rib has a width in a range from 3 mm to 5 mm.

According to another aspect, each rib has a thickness in a range from 1 mm to 3 mm.

According to another aspect, a retainer defines a rectangular shape. Each side of the retainer defines two ribs. Each rib extends from an inner edge to an outer edge of the rim.

According to another aspect, two ribs on a first side of a retainer are vertically aligned with two ribs on an opposing second side of the retainer. Two ribs on a third side of the retainer are horizontally aligned with two ribs on an opposing fourth side of the retainer.

According to another aspect, a coupling portion at least partially extends along an underside of a rim and at least partially over an engagement surface. Ribs maintain a space between the engagement surface and the coupling portion of a gasket.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A refrigeration appliance, comprising:
   a cabinet defining a cabinet outlet and a cabinet inlet in fluid communication with a freezer compartment;
   a door pivotally coupled to the cabinet, wherein the door defines a door inlet in fluid communication with the cabinet outlet and a door outlet in fluid communication with the cabinet inlet when the door is in a closed position;
   an icemaker compartment disposed in the door, wherein the icemaker compartment is fluidly coupled with the freezer compartment;
   a retainer at least partially disposed in each of the door inlet and the door outlet, wherein each retainer includes a rim defining ribs, and wherein each rib is spaced apart from adjacent ribs, and wherein each retainer includes an insertion wall extending through one of the door inlet and the door outlet, respectively, and wherein the insertion wall defines coupling features on opposing sides of the retainer and notches on opposing sides of each coupling feature allowing for a deformation of each coupling feature towards the opposing coupling feature; and
   a gasket coupled to each retainer, wherein each gasket includes an abutment surface that abuts a cabinet surface when the door is in the closed position to seal airflow passages between the freezer compartment and the icemaker compartment.

2. The refrigeration appliance of claim 1, wherein each coupling feature defines a plurality of teeth that interlock with an edge of a duct.

3. The refrigeration appliance claim 1, wherein the ribs extend at least partially into a space defined by the gaskets, respectively, to prevent a vacuum suction effect on the gaskets when the door is in the closed position.

4. The refrigeration appliance of claim 1, wherein each gasket includes a sealing member spaced from the respective retainer and defining a channel, wherein each gasket adjusts to a compressed state when the door is in the closed position.

5. The refrigeration appliance of claim 4, wherein the ribs maintain space between the gasket and the retainer, respectively, to prevent a vacuum suction effect, and wherein each gasket adjusts from the compressed state to an expanded state when the door is moved to an opened position.

6. The refrigeration appliance of claim 1, wherein each rib extends from an inner edge to an outer edge of the rim of the retainer.

7. An appliance door, comprising:
   a panel defining an inlet and an outlet adjacent to the inlet;
   an icemaker compartment fluidly coupled to the inlet via an air duct and fluidly coupled to the outlet via a return duct;
   at least one retainer disposed adjacent to one of the inlet and the outlet, wherein the at least one retainer includes an insertion wall extending through the panel and a rim extending over the panel, wherein the rim defines ribs, and wherein each rib is spaced from adjacent ribs; and
   at least one gasket coupled to the at least one retainer, wherein the at least one gasket compresses toward the at least one retainer, and wherein the ribs maintain a space within the at least one gasket to prevent a vacuum suction effect, and wherein the at least one gasket includes a U-shaped coupling portion extending over an outer edge of the rim and having a first extension that extends between the panel and an inner surface of the rim and a second extension that extends over an engagement surface of the rim and the ribs, and wherein the ribs maintains a space between the second extension and the engagement surface, and wherein a C-shaped sealing member extends from the second extension, the C-shaped sealing member defining an inner channel having an opening facing the insertion wall.

8. The appliance door of claim 7, wherein the at least one retainer includes a first retainer disposed adjacent to the inlet and coupled to the air duct and a second retainer disposed adjacent to the outlet and coupled to the return duct, and wherein the at least one gasket includes a first gasket coupled to the first retainer and a second gasket coupled to the second retainer.

9. The appliance door of claim 8, wherein each of the first and second retainers define a plurality of teeth for interlocking with edges of the air duct and the return duct, respectively.

10. The appliance door of claim 7, wherein the at least one retainer defines a quadrilateral shape, wherein at least two ribs are defined on each side of the at least one retainer, and wherein the at least two ribs on each side includes a first rib arranged parallel to a second rib.

11. The appliance door of claim 7, wherein each rib extends from an inner edge to an outer edge of the rim of the at least one retainer.

12. The appliance door of claim 7, wherein the at least one gasket is operable between a compressed state and an expanded state, and wherein the ribs disposed between the first and second extensions of the coupling portion prevent a vacuum suction effect on the at least gasket allowing the at least one gasket to adjust to the expanded state from the compressed state.

13. A door vent sealing assembly for an appliance, comprising:
   a retainer including:
      an insertion wall at least partially defining an aperture, wherein the insertion wall defines coupling features on opposing sides of the retainer to engage a duct; and
      a rim coupled to the insertion wall, wherein the rim extends perpendicular to the insertion wall and outward from the aperture, and wherein the rim includes an engagement surface defining ribs having a semi-circular cross-sectional shape; and a gasket having a coupling portion for receiving the rim to couple the gasket to the retainer and a sealing member spaced from and extending over the rim, wherein the ribs maintain space within the gasket when the gasket is in a compressed state to prevent a vacuum suction effect.

14. The door vent sealing assembly of claim 13, wherein each rib has a width in a range from 3 mm to 5 mm.

15. The door vent sealing assembly of claim 13, wherein each rib has a thickness in a range from 1 mm to 3 mm.

16. The door vent sealing assembly of claim 13, wherein the retainer defines a rectangular shape, and wherein each side of the retainer defines two ribs, and wherein each rib extends from an inner edge to an outer edge of the rim.

17. The door vent sealing assembly of claim 16, wherein the two ribs on a first side of the retainer are vertically aligned with the two ribs on an opposing second side of the retainer, and wherein the two ribs on a third side of the retainer are horizontally aligned with the two ribs on an opposing fourth side of the retainer.

18. The door vent sealing assembly of claim 13, wherein the coupling portion at least partially extends along an underside of the rim and at least partially over the engagement surface, and wherein the ribs maintain the space between the engagement surface and the coupling portion of the gasket.

* * * * *